(12) United States Patent
Zhang et al.

(10) Patent No.: US 11,689,335 B2
(45) Date of Patent: Jun. 27, 2023

(54) SIGNALING CONFIGURATION FOR RADIO ACCESS NETWORKS

(71) Applicant: Telefonaktiebolaget LM Ericsson (publ), Stockholm (SE)

(72) Inventors: Jianwei Zhang, Solna (SE); Jingya Li, Gothenburg (SE); Robert Baldemair, Solna (SE); Henning Wiemann, Aachen (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 87 days.

(21) Appl. No.: 17/256,328

(22) PCT Filed: Jun. 29, 2018

(86) PCT No.: PCT/SE2018/050713
§ 371 (c)(1),
(2) Date: Dec. 28, 2020

(87) PCT Pub. No.: WO2020/005128
PCT Pub. Date: Jan. 2, 2020

(65) Prior Publication Data
US 2021/0266887 A1    Aug. 26, 2021

(51) Int. Cl.
*H04L 5/00*    (2006.01)
*H04W 72/04*    (2023.01)
(Continued)

(52) U.S. Cl.
CPC ........... *H04L 5/0053* (2013.01); *H04W 72/20* (2023.01); *H04L 5/0051* (2013.01); *H04L 27/2602* (2013.01); *H04L 27/26025* (2021.01)

(58) Field of Classification Search
CPC ......... H04W 72/0406; H04W 72/1278; H04W 74/0833; H04L 5/0053; H04L 27/26025;
(Continued)

(56) References Cited

U.S. PATENT DOCUMENTS

| 2013/0121266 A1* | 5/2013 | Ko | H04J 11/005 370/329 |
|---|---|---|---|
| 2013/0194990 A1* | 8/2013 | Banister | H04W 52/0216 370/311 |

(Continued)

FOREIGN PATENT DOCUMENTS

| EP | 2765817 A1 | 8/2014 |
|---|---|---|
| EP | 2827671 A1 | 1/2015 |
| WO | 2018097680 A1 | 5/2018 |

OTHER PUBLICATIONS

International Search Report and Written Opinion dated Mar. 6, 2019 for International Application No. PCT/SE2018/050713 filed on Jun. 29, 2018, consisting of 12-pages.
(Continued)

*Primary Examiner* — Ayaz R Sheikh
*Assistant Examiner* — Tarell A Hampton
(74) *Attorney, Agent, or Firm* — Christopher & Weisberg, P.A.

(57) ABSTRACT

There is disclosed a method of operating a user equipment, UE, in a radio access network, the UE being configured with UE-specific configuration for transmitting signaling on a physical channel, the UE further having a general configuration for transmitting signaling on the physical channel, wherein the method includes transmitting signaling on the physical channel based on the general configuration ignoring the UE-specific configuration. The disclosure also pertains to related methods and devices.

11 Claims, 3 Drawing Sheets

(51) Int. Cl.
*H04W 72/12* (2023.01)
*H04L 27/26* (2006.01)
*H04W 72/20* (2023.01)

(58) Field of Classification Search
CPC ... H04L 5/0085; H04L 5/006; H04L 27/2602; H04L 5/0007; H04L 5/0012; H04L 5/0051; H04L 5/0094
See application file for complete search history.

(56) References Cited

U.S. PATENT DOCUMENTS

| | | | | |
|---|---|---|---|---|
| 2013/0295983 | A1* | 11/2013 | Kim | H04W 52/146 455/522 |
| 2015/0162966 | A1* | 6/2015 | Kim | H04L 5/0053 370/252 |
| 2017/0064675 | A1* | 3/2017 | Kim | H04W 72/042 |
| 2018/0034604 | A1* | 2/2018 | Rico Alvarino | H04L 5/0091 |
| 2018/0048444 | A1* | 2/2018 | Park | H04L 5/0053 |
| 2018/0098234 | A1* | 4/2018 | Kim | H04B 7/0478 |
| 2018/0324888 | A1* | 11/2018 | Shi | H04W 76/30 |
| 2019/0045495 | A1* | 2/2019 | Chen | H04L 5/1469 |
| 2019/0305923 | A1* | 10/2019 | Luo | H04W 72/12 |
| 2019/0335449 | A1* | 10/2019 | Xiong | H04L 5/0037 |
| 2020/0221428 | A1* | 7/2020 | Moon | H04W 72/042 |
| 2020/0288482 | A1* | 9/2020 | Yi | H04W 72/121 |
| 2020/0344034 | A1* | 10/2020 | Moon | H04W 72/02 |
| 2021/0168807 | A1* | 6/2021 | Jung | H04L 27/00 |
| 2021/0266887 | A1* | 8/2021 | Zhang | H04W 72/0406 |
| 2021/0274531 | A1* | 9/2021 | Yamamoto | H04W 72/1284 |
| 2021/0385826 | A1* | 12/2021 | Moon | H04J 11/00 |

OTHER PUBLICATIONS

3GPP TS 38.331 V15.1.0; 3rd Generation Partnership Project; Technical Specification Group Access Network; NR; Radio Resource Control (RRC) protocol specification (Release 15); Mar. 2018, consisting of 268-pages.

3GPP TSG-RAN1 Meeting #93 R1-1807958; Title; CR to 38.214 capturing the RAN1#92bis and RAN1#93 meeting agreements; Source: Nokia; Work item code: NR_newRAT-Core; Date and Location: May 21-25, 2018, Busan, Korea, consisting of 96-pages.

3GPP TSG-RAN1 Meeting #93 R1-1807955; Title: CR to 38.211 capturing the RAN1#92bis and RAN1#93 meeting agreements; Source: Ericsson; Work item code: NR_newRAT-Core; Date and Location: May 21-25, 2018, Busan, Korea, consisting of 105-pages.

3GPP TSG RAN WG1 Meeting #92 R1-1803535; Title: RAN1 open issues based on merged correction on L1 parameters for EN-DC 38.331; Agenda Item: 7.1; Source: Ericsson; Document for: Discussion & Decision; Date and Location: Feb. 26-Mar. 2, 2018, Athens, Greece, consisting of 252-pages.

* cited by examiner

… (1)

SIGNALING CONFIGURATION FOR RADIO ACCESS NETWORKS

CROSS-REFERENCE TO RELATED APPLICATIONS

This application is a Submission Under 35 U.S.C. § 371 for U.S. National Stage Patent Application of International Application Number: PCT/SE2018/050713, filed Jun. 29, 2018 entitled "SIGNALING CONFIGURATION FOR RADIO ACCESS NETWORKS," the entirety of which is incorporated herein by reference.

TECHNICAL FIELD

This disclosure pertains to wireless communication technology, in particular in the context of radio access technology allowing different multiple-access approaches for uplink signaling.

BACKGROUND

New wireless communication technology allows increasing flexibility to cover more and more use-cases. For example, 5G-NR (New Radio according to 3GPP) technology allows different multiple access schemes or waveforms for transmissions of user equipments, namely OFDMA (Orthogonal Frequency Division Multiple Access) and SC-FDMA (Single Carrier Frequency Division Multiple Access, also referred to as Discrete Fourier Transform, DFT, FDMA, or Transform Precoding FDMA). In many cases, the large number of possible transmission modes can lead to problems, e.g. in misconfiguration scenarios, in particular after a connection has been terminated and reconnection has to be performed.

SUMMARY

It is an object of this disclosure to provide approaches allowing improved handling of transmission of signaling, in particular for configurations for different waveforms and/or multiple access approaches, e.g. in the context of loss of radio connection and/or reconnection.

The approaches are particularly advantageously implemented in a 5th Generation (5G) telecommunication network or 5G radio access technology or network (RAT/RAN), in particular according to 3GPP ($3^{rd}$ Generation Partnership Project, a standardisation organization). A suitable RAN may in particular be a RAN according to NR, for example release 15 or later, or LTE Evolution.

There is disclosed a method of operating a user equipment in a radio access network. The user equipment (UE) is configured with a UE-specific configuration for transmitting signaling on a physical channel. The UE further hays a general configuration for transmitting signaling on the physical channel. The method comprises transmitting signaling on the physical channel based on the general configuration ignoring the UE-specific configuration.

Moreover, a user equipment for a radio access network is disclosed. The UE is adapted for being configured or configurable with a UE-specific configuration for transmitting signaling on a physical channel. The UE is further adapted for having a general configuration for transmitting signaling on the physical channel. The method comprises transmitting signaling on the physical channel based on the general configuration ignoring the UE-specific configuration. The user equipment may comprise, and/or be adapted for utilising, processing circuitry and/or radio circuitry, in particular a transmitter and/or transceiver and/or receiver, for transmitting the signaling and/or being configured.

The approaches allow reliable and predictable behaviour of UEs in particular when connection is lost and has to be re-established (reconnection has to be performed).

The signaling may be transmitted by the UE in uplink or sidelink. The UE-specific configuration may be configured to the UE by the network, e.g. a network node, or another UE, e.g. in a sidelink scenario. Transmitting of signaling on a channel may in particular be based on a general configuration pertaining to the channel, e.g. a PUSCH configuration. Transmitting signaling may comprise transmitting associated reference signaling, e.g. sounding reference signaling and/or in particular demodulation reference signaling like DMRS, which may be associated to the signaling and/or the channel. A configuration may configure and/or represent one or more parameters and/or indications associated to such reference signaling.

Transmitting signaling ignoring the UE-specific configuration may comprise not using one or more, or all, parameters of a UE-specific configuration for transmitting the signaling, e.g. for determining the waveform and/or resource mapping and/or resource usage. The corresponding signaling may not follow or represent the UE-specific configuration in one or more or all parameters, and/or may be determined and/or transmitted without using the UE-specific parameter/s. A UE-specific configuration may comprise one or more parameters configured specific to the UE, e.g. with dedicated signaling. Dedicated signaling may be addressed and/or intended specifically to the UE, e.g. using an identification or indication, and/or scrambling with RNTI associated to the UE, and/or using resources allocated specifically to the UE. Dedicated signaling may in particular be and/or comprise higher-layer signaling like RRC signaling and/or MAC signaling, or control signaling on the physical layer, e.g. DCI signaling. Dedicated signaling may be control signaling. DCI signaling or physical layer signaling may scheduled and/or trigger the transmitting of the signaling."

In general, one or more parameters or indications may indicate whether the UE-specific configuration is to be ignored or not. Such a parameter and/or indicated may pertain to whether transform precoding is to be used for transmitting the signaling, e.g. a msg3 or msg3 retransmission for a random access. It may be considered that the parameter and/or indication is in a general configuration, e.g. broadcast in a system information block, which may be provided in a PBCH or PDSCH transmission. It may be considered that the parameter or indication is included in a random access configuration or information element pertaining thereto, e.g. RACH-ConfigCommon. A general configuration, and/or a cell-specific configuration, may be configured with broadcast and/or multicast signaling, e.g. with SSBlock/PBCH and/or PDSCH and/or SIB and/or MIB (Master Information Block) signaling.

A UE may be considered to be configured with, and/or have, a configuration if it has one or more parameters or settings according to the configuration. A configured configuration may be a configuration according to control signaling, which may comprise configuration information and/or data representing the configuration. A UE may have a default configuration, which e.g. may be stored in a memory and/or according to a standard.

The physical channel may be a shared channel, although in some cases, a dedicated channel or common channel may be considered. It may be considered that the channel is an uplink channel, or in some cases a sidelink channel. In some variants, the channel may be a data channel, or a random access channel or control channel.

Transmitting the signaling may be performed after being configured with the UE-specific configuration, and/or after loss of connection, e.g. after radio link failure or connection failure has been detected and/or occurred, and/or when an RRC reconnection procedure and/or handover procedure is to be performed. The detection of a link failure or connection failure may be by the UE, and/or be indicated to the UE with signaling from another node, e.g. a network node.

Transmitting the signaling may be based on received control signaling, in particular physical layer signaling and/or DCI. Transmitting the signaling may be based on the format of a DCI message scheduling the transmission of the signaling. For example, if the DCI has format 0_0 or 0_1 according to the NR standard, a UE-specific configuration may be ignored.

120 In some variants, it may be considered that the signaling represents a message on a physical channel, e.g. a Physical Uplink Shared Channel, and/or represents a random access message. The message may be a msg3 of a random access procedure, e.g. in response to a msg2 triggered by a msg1 transmitted by the UE. Random access may be used for reconnection, and/or for requesting resources, e.g. if no resources for a scheduling request are available for the UE, e.g. no PUCCH resource/s or PUSCH resources have been configured/allocated to the UE. The random access may be a 4-step random access; it may be assumed that the UE has been in RRC connection mode with the network node or associated cell, and/or has been configured with a UE-specific configuration, e.g. with RRC signaling, by the network node.

The UE-specific configuration may be ignored based on an indication indicating a multiple-access approach and/or waveform for the transmitting. Such an indication may be part of a configuration and/or control signaling, and/or a default. In particular, the indication may be part of the UE-specific configuration or the general configuration. If it is part of the UE-specific configuration, ignoring the UE-specific configuration may comprise ignoring all parameters and/or indications of the UE-specific indication but this. In many cases, the multiple-access will be indicated with a general configuration, e.g. broadcast signaling.

The signaling transmitted by the UE may in particular represent a msg3 of a random access procedure. Such a msg3 may be transmitted on a PUSCH, and/or may be transmitted for reconnection, e.g. after radio link failure. The msg3 may be used in a 4-step random access (e.g., initial access), or in a random access without using the msg1, e.g. for reconnection and/or when link failure occurred.

It may be considered that the general configuration represents a default configuration and/or a cell-specific configuration. A cell-specific configuration may in general comprise on or more parameters and/or settings for a plurality of UEs, and/or for all UEs in the cell. It may be considered that parameters and/or setting of a default configuration and/or cell-specific configuration may be overridden by a UE-specific configuration for the specifically configured UE.

In general, ignoring the UE-specific configuration may be based on a parameter and/or indication, or more than one thereof, indicating a transform precoder to be used for transmitting the signaling. A parameter or indication indicating a transform precoder to be used for transmitting the signaling may indicate that SC-FDMA and/or DFT-FDMA (or the corresponding SC-FDM or DFT-FDM waveform) is to be used, explicitly or implicitly. Such an indication or parameter, or the associated configuration, may be signaling used broadcast signaling, in particular SSBlock/PBCH signaling and/or RMSI (Remaining Minimum System Information) signaling, e.g. on a PDSCH. Resources for RMSI signaling may be indicated with a broadcast of SSBlock/PBCH signaling, and/or with (common) PDCCH signaling, for which resources may be indicated with SSBlock/PBCH signaling. SSBlock/PBCH signaling may represent synchronisation signaling (e.g., PSS and/or SSS—Primary and/or Secondary Synchronisation Signaling) and signaling on a Physical Broadcast Channel, which may be associated to, and/or combined with, the synchronisation signaling.

It may be considered that the UE-specific configuration is configured with dedicated signaling to the UE. The dedicate signaling for the UE-specific configuration may be transmitted by a network node.

There is also considered a program product comprising instructions adapted for causing processing circuitry to control and/or perform a method as described herein.

Moreover, a carrier medium arrangement carrying and/or storing a program product as described herein is disclosed.

BRIEF DESCRIPTION OF THE DRAWINGS

The drawings are provided to illustrate concepts and approaches described herein, and are not intended to limit their scope. The drawings comprise.

DETAILED DESCRIPTION

Figure 1:
FIG. 1, showing an exemplary random access procedure.

A random access (RA) procedure is a key function in a cellular communication system. In NR, a UE 10 that would like to access the network initiates the random access procedure by transmitting a preamble (Msg1) in the uplink on the Physical Random Access Channel (PRACH), e.g. after cell identification and/or synchronisation based on reading the SSBlock and/or RMSI. A network node 100 (e.g., gNB, next generation Node B, or TRP, Transmission and Reception Point, a base station, access node) receiving the preamble and detecting the random-access attempt will respond in the downlink by transmitting a random-access response (RAR/Msg2). The RAR carries an uplink scheduling grant (e.g., for PUSCH) for the UE to continue the procedure by transmitting a following subsequent message in the uplink (Msg3) for terminal identification, as illustrated in FIG. 1.

Before transmission of the PRACH preamble, the UE receives both a set of synchronization signals and configuration parameters on a broadcast channel in an SS-block (e.g., NR-PSS, NR-SSS, NR-PBCH), possibly complemented with configuration parameters received on yet another channel like a PDSCH carrying RMSI or a PDCCH.

Msg3 is transmitted by using a PUSCH channel. Besides Msg3 payload, DMRS is also transmitted to assist the data decoding at the network node. In both LTE and NR, for a 4-step random access procedure, the initial transmission of Msg3 is scheduled by the UL grant contained in RAR. Retransmission of Msg3 is scheduled by PDCCH, using DCI format 0_0 with CRC scrambled by TC-RNTI (temporary C-RNTI, assigned with msg2).

Physical layer processing for NR PUSCH is described in the following. PUSCH is one of the uplink physical channels that is mainly used for carrying uplink data information and layer 1/2 control information, e.g. as UCI on PUSCH. The physical layer processing of an UL transport block is as follows: A transport block CRC is first appended to provide error detection, followed by a LDPC base graph selection. Then segmentation of the transport block into code blocks and code block CRC attachment are performed. Each code block is individually LDPC encoded. The LDPC coded blocks are then individually rate matched. Finally, code block concatenation is performed to create a codeword for transmission on the PUSCH. The contents of the codeword are scrambled and modulated to generate a block of complex-valued modulation symbols. The symbols are then mapped onto one or several layers. PUSCH supports a single codeword that can be mapped up to 4 layers. In case of a single layer transmission only, DFT transform precoding can optionally be applied if enabled, to achieve a SC-FDM waveform/SC-FDMA. Transform precoding may be considered enabled if indicated and/or configured with at least one corresponding indication or parameter, which may be referred to as TP parameter.

PUSCH DMRS sequence generation may be considered—DMRS is transmitted together with PUSCH to assist the data decoding at the eNB. NR PUSCH DMRS sequence generation, precoding and mapping to physical resources may be according to the NR standard. Depending on whether transform precoding is enabled or disabled, different approaches for DMRS may be utilised or configured.

When transform precoding is disabled, PUSCH DMRS sequence is QPSK based on Gold sequences. The symbols containing DMRS cannot be used for PUSCH. The initialization value for DMRS sequence generation depends on the DMRS symbol index, the slot index and the 16-bit UE-specific configurable DL-DMRS-scrambling-ID (for non-msg3 PUSCH) or physical Cell ID (for msg3 PUSCH).

When transform precoding is enabled, the PUSCH DMRS sequence represents a low PAPR Zadoff-Chu based sequence. The sequence generation can be configured by higher layers with either group hopping or sequence hopping in order to separate the reference signals sent from different UEs. It is also possible for the network to disable both group hopping and sequence hopping for PUSCH DMRS sequence generation. The DMRS sequence may configured in a UE-specific configuration.

Below are details of PUSCH DMRS sequence generation when transform precoding is enabled according to NR standard.

Sequence generation when transform precoding is enabled:

If transform precoding for PUSCH is enabled, the reference-signal sequence r(n) may be generated according to $$r(n) = r_{u,v}^{(\alpha,\delta)}(n)$$

$$n = 0, 1, \ldots, M_{sc}^{PUSCH}/2^{\delta} - 1$$

where $r_{u,v}^{(\alpha,\delta)}(m)$ is given with $\delta=1$ and $\alpha=0$ for a PUSCH transmission dynamically scheduled by DCI.

The sequence group $u = (f_{gh} + n_{ID}^{RS}) \mod 30$, where $n_{ID}^{RS}$ is given by $n_{ID}^{RS} = n_{ID}^{PUSCH}$ if $n_{ID}^{PUSCH}$ is configured by the higher-layer parameter nPUSCH-Identity in the DMRS-UplinkConfig IE and the PUSCH is not a msg3 PUSCH.

$n_{ID}^{RS} = N_{ID}^{cell}$ otherwise where $f_{gh}$ and the sequence number v are given by:
if neither group, nor sequence hopping may be used $$f_{gh} = 0$$

$$v = 0$$

if group hopping but not sequence hopping may be used $$f_{gh} = \left( \sum_{m=0}^{7} 2^m c\big(8(N_{symb}^{slot} n_{s,f}^{\mu} + l) + m\big) \right) \mod 30$$

$$v = 0$$

where the pseudo-random sequence c(i) may be initialized with
$c_{init} = \lfloor n_{ID}^{RS}/30 \rfloor$ at the beginning of each radio frame
if sequence hopping but not group hopping is used $$f_{gh} = 0$$

$$v = \begin{cases} c(N_{symb}^{slot} n_{s,f}^{\mu} + l) & \text{if } M_{ZC} \geq 6 N_{sc}^{RB} \\ 0 & \text{otherwise} \end{cases}$$

where the pseudo-random sequence c(i) may be initialized with $c_{init} = n_{ID}^{RS}$ at the beginning of each radio frame.

The quantity l above is the OFDM symbol number except for the case of double-symbol DMRS, in which case l is the OFDM symbol number of the first symbol of the 285 double-symbol DMRS.

PUSCH DMRS configuration parameters are discussed in the following. Different configurations can be applied for PUSCH DMRS. Configured parameters are usually decided by the network for optimizing the capacity or reducing the latency or fulfilling other requirements. From a UE perspective, those parameters are either set as default values or signaled from the network by higher layer signaling.

Cell-specific PUSCH configuration are discussed. The IE (Information Element) PUSCH-ConfigCommon contained in SIB1 (System Information Block 1, broadcast system information) may be used to configure cell-specific PUSCH (e.g., msg3 PUSCH) parameters. An IE may generally comprise and/or represent one or more parameters and/or indications. An IE may be associated to higher-layer signaling, in particular RRC signaling. A higher layer parameter msg3-transformPrecoding contained in RACH-ConfigCommon in SIB1 may be used to indicate to the UE whether transform precoding is enabled for msg3 transmission.

The DMRS sequence generation for msg3 PUSCH may be configured by a higher layer parameter groupHoppingEnabledTransformPrecoding- In the context of the UE procedure for applying transform precoding on PUSCH, for Msg3 PUSCH transmission, the UE may consider the transform precoding either 'enabled' or 'disabled' according to the higher layer configured parameter msg3-transformPrecoding.

For other PUSCH transmission, e.g. scheduled with a DCI/scheduling grant:
If the DCI with the scheduling grant was received with DCI format 0_0, the UE may, for this PUSCH transmission, consider the transform precoding either enabled or disabled according to the higher layer configured parameter msg3-transformPrecoding.
If the DCI with the scheduling grant was not received with DCI format 0_0
If the UE is configured with the higher layer parameter [transform-precoding-schedule], the UE may, for this PUSCH transmission, consider the transform precoding either enabled or disabled according to this parameter.

If the UE is not configured with the higher layer parameter [transform-precoding-schedule], the UE may, for this PUSCH transmission, consider the transform precoding either enabled or disabled according to the higher layer configured parameter msg3-transformPrecoding.

For PUSCH transmission without grant, e.g. based on a semi-static resource allocation:
If the UE is configured with the higher layer parameter [transform-precoding-TWG], the UE may, for this PUSCH transmission, consider the transform precoding either enabled or disabled according to this parameter.
If the UE is not configured with the higher layer parameter [transform-precoding-TWG], the UE may, for this PUSCH transmission, consider the transform precoding either enabled or disabled according to the higher layer configured parameter msg3-transformPrecoding.

Modulation order and target code rate determination for PUSCH is discussed in the following. For the PUSCH assigned by a DCI format 0_0/0_1 with CRC scrambled by C-RNTI, TC-RNTI, or SP-CSI-RNTI, the transform precoding is enabled if transformPrecoder in PUSCH-Config is set to 'enabled', or if transformPrecoder in PUSCH-Config is not configured and msg3-transformPrecoding in rach-ConfigCommon is set to 'enabled'; otherwise the transform precoding is disabled.

For PUSCH assigned by a DCI format 0_0/0_1 with CRC scrambled by CS-RNTI, or the PUSCH with configured grant using CS-RNTI, the transform precoding is enabled if transformPrecoder in ConfiguredGrantConfig is set to 'enabled'; otherwise the transform precoding is disabled.

The cell specific configurations used in MSG3 should be clarified with signaling or default assumptions. When preparing msg3 PUSCH transmission for a random access procedure, e.g., for radio link failure and beam failure recovery—both cases of connection failure or reconnection therefrom, respectively, or when the UE has no dedicated scheduling request (SR) configured, a UE may still have higher layer parameters obtained from previous dedicated RRC signaling, which the network may not be aware of. If a new RRC configuration (e.g., RRC reconfiguration, or msg2 configuration with limited parameters) does not override all the previous dedicated (UE-specific) RRC configurations, in particular msg3 transmission may be misconfigured. In case the UE has no dedicated SR resources, a RACH procedure may be used instead, based on an existing RRC configuration.

For example, when the parameter msg3-transformPrecoding in SIB1 (SIB1 may contain PUSCH-ConfigCommon and RACH-ConfigCommon) is enabled and the parameter groupHoppingEnabledTransformPrecoding in SIB 1 is disabled, situations may occur when it is not clear to the UE whether it should apply sequence hopping to DMRS for msg3 PUSCH or not if previously configured.

Another example is, if groupHoppingEnabledTransformPrecoding is not present in SIB1, but msg3-transformPrecoding is enabled in SIB1. It is not clear if the UE shall use previously configured hopping option or this shall be an invalid configuration.

In particular for PUSCH signaling like a RA MSG3, it is suggested ignoring the dedicatedly configured PUSCH parameters from RRC connected UEs (UE-specific configuration), and use a general configuration, e.g. default configuration together with cell-specific configuration, in particular for MSG3. It should be noted that a configuration may be configured with one or more than one message/signalings and/or with signaling on more than one channels.

A general configuration, in particular a cell-specific configuration may be configured e.g. with signaling and/or control messages on PBCH and/or PDSCH and/or SSBlock.

It thus is proposed that a UE may ignore for Msg3 (at least when transform precoding is enabled for Msg3) a UE-specific configuration and/or UE-specific parameters (such as sequenceHoppingEnabled), but only applies cell-specific parameters and/or follows a default rule for Msg3 transmission.

For PUSCH transmissions other than Msg3 that use transform precoding (e.g., because transform precoding is enabled for Msg3 and PUSCH is scheduled with DCI format 0-0, or transform precoding is configured for PUSCH with higher layer signaling), the following may be considered: If the UE is provided/configured with (UE-specific) parameter sequenceHoppingEnabled and/or disableSequenceGroupHopping, it may follow these parameters. If any of these parameters is absent the following possibilities can be envisioned:
   The UE should apply w.r.t. the missing parameter(s) the same behavior as it does for Msg3 (e.g., follow groupHoppingEnabledTransformPrecoding from PUSCH-ConfigCommon if disableSequenceGroupHopping is missing, and/or apply sequence hopping behavior from Msg3 if sequence Hopping Enabled is missing)
   The UE applies a default rule w.r.t. the missing parameter(s)

The same or different behavior can be applied for PUSCH if PUSCH is scheduled with DCI 0-0 and uses Msg3 waveform, or because PUSCH is configured with transform precoding.

Ambiguity of RA Msg3 using the dedicatedly configured (UE-specific) PUSCH parameters from RRC connected UEs may be avoided with the approaches described herein. Also, DMRS configuration for MSG3 PUSCH with transform-precoding enabled will be predictable. Moreover, DMRS configuration for PUSCH transmission that is not configured UE specific and/or with dedicated signaling will be unambiguous with low signaling overhead. Signaling load on the RRC layer may be reduced.

According to suggested approaches, the UE may ignore for Msg3 and Msg3 retransmission (at least when transform precoding is enabled for Msg3) any UE-specific parameters (such as sequenceHoppingEnabled), but only applies cell-specific parameters and/or follows a default rule for Msg3 transmission, representing a default configuration. Msg3 retransmission may be considered Msg 3 transmission, which may be triggered and/or scheduled with DCI, e.g. on PDCCH. When transform precoding is enabled for PUSCH, the DMRS sequence hopping may be configured by using dedicated RRC signaling. As a default, the DMRS sequence hopping may be considered disabled for msg3 PUSCH with transform precoding enabled. Alternatively, DMRS sequence hopping may be considered always enabled.

When msg3-transformPrecoding is enabled, UE may apply a default configuration for the group sequence hopping in DMRS sequence generation for MSG3 transmission and retransmission on PUSCH.
   If groupHoppingEnabledTransformPrecoding is absent in PUSCH-ConfigCommon, the group hopping may be considered as disabled.
   Or, the DMRS sequence hopping may be considered as always disabled/enabled.

A UE may interpret received signaling parameters and/or configurations according to exemplary alternatives:

Alternative 1:
msg3-TransformPrecoding=enabled
groupHoppingEnabledTransformPrecoding=absent
Both group hopping and sequence hopping disabled
groupHoppingEnabledTransformPrecoding=enabled
group hopping enabled, sequence hopping disabled
groupHoppingEnabledTransformPrecoding=disabled
group hopping disabled, sequence hopping enabled
Alternative 2:
msg3-TransformPrecoding=enabled
groupHoppingEnabledTransformPrecoding=absent
Both group hopping and sequence hopping disabled
groupHoppingEnabledTransformPrecoding=enabled
group hopping enabled, sequence hopping disabled
groupHoppingEnabledTransformPrecoding=disabled
group hopping disabled, sequence hopping disabled For PUSCH transmissions other than Msg3 that use transform precoding (either because transform precoding is enabled for Msg3 and PUSCH is scheduled with DCI format 0-0 or transform precoding is configured for PUSCH): If UE is provided with parameter sequenceHoppingEnabled and/or disableSequenceGroupHopping it may follow these parameters. If any of these parameters is absent, the following possibilities can be envisioned:

The UE may apply w.r.t. the missing parameter(s) the same behavior as it does for Msg3 (i.e. follow groupHoppingEnabledTransformPrecoding from PUSCH-ConfigCommon if disableSequence-GroupHopping is missing, apply sequence hopping behavior from Msg3 if sequenceHoppingEnabled is missing)

The UE applies a default rule w.r.t. (with regards to) the missing parameter(s)

The same or different behavior can be applied for PUSCH if PUSCH is scheduled with DCI 0-0 and uses Msg3 waveform or because PUSCH is configured with transform precoding.

In general, it may be considered that for PUSCH assigned by a DCI format 0_0/0_1 with CRC scrambled by C-RNTI, TC-RNTI, or SP-CSI-RNTI, the transform precoding is enabled if transformPrecoder in PUSCH-Config is set to 'enabled', or if transformPrecoder in PUSCH-Config is not configured and msg3-transformPrecoding in rach-Config-Common is set to 'enabled'; otherwise the transform precoding may be considered to be disabled. In case of transform precoding being enabled by msg3-transform Precoding for PUSCH transmission (e.g., no UE-specific signaling has been received), for PUSCH assigned by a DCI format 0_0/0_1 with CRC scrambled by C-RNTI, TC-RNTI, or SP-CSI-RNTI, the same hopping configuration as MSG3 may be followed. Alternatively, UE may apply for such PUSCH transmissions transform precoding and applies the DM-RS hopping behavior it derives from parameters (if any) in PUSCH-ConfigCommon (e.g. groupHoppingEnabledTransformPrecoding) and PUSCH-Config (e.g. sequenceHoppingEnabled).

For Msg3 PUSCH transmission, a UE may consider the transform precoding either 'enabled' or 'disabled' according to the higher layer configured parameter msg3-transform-Precoding, or according to another indication, e.g. of a default or cell-specific configuration.

For PUSCH transmission scheduled with a DCI like a grant:

If the DCI with the scheduling grant was received with DCI format 0_0, the UE may, for this PUSCH transmission, consider the transform precoding either enabled or disabled according to the higher layer configured parameter msg3-transform Precoding.

If the DCI with the scheduling grant was not received with DCI format 0_0

If the UE is configured with the higher layer parameter [transform-precoding-scheduled], the UE may, for this PUSCH transmission, consider the transform precoding either enabled or disabled according to this parameter.

If the UE is not configured with the higher layer parameter [transform-precoding-scheduled], the UE may, for this PUSCH transmission, consider the transform precoding either enabled or disabled according to the higher layer configured parameter msg3-transformPrecoding.

For PUSCH transmission without grant

If the UE is configured with the higher layer parameter [transform-precoding-TWG], the UE may, for this PUSCH transmission, consider the transform precoding either enabled or disabled according to this parameter.

If the UE is not configured with the higher layer parameter [transform-precoding-TWG], the UE may, for this PUSCH transmission, consider the transform precoding either enabled or disabled according to the higher layer configured parameter msg3-transformPrecoding.

In case of transform precoding is enabled by msg3-transformPrecoding for PUSCH transmission, the same hopping configuration as for MSG3 may be followed. Alternatively, the UE applies for such PUSCH transmissions transform precoding and applies the DM-RS hopping behavior it derives from parameters (if any) in PUSCH-Config-Common (e.g. groupHoppingEnabledTransformPrecoding) and PUSCH-Config (e.g. sequenceHoppingEnabled).

For downlink transmissions, a similar rule as the for MSG3 in uplink can be applied for some types of signaling, e.g. signaling carrying system information, and/or paging and/or MSG2 transmission. For example, a UE may ignore for reception, and/or a network node may transmit ignoring, a UE-specific configuration, but only apply cell-specific parameters and/or follows a default rule, e.g. for the channel/s like PDCCH/PDSCH used for such signaling, in particular for system information, paging and MSG2 transmission. This may in particular be in the context of reconnection, and/or radio link or beam failure or recovery, and/or in random access for requesting resources for uplink transmission, e.g. in lieu of a scheduling request. In general, there may be considered a network node adapted for transmitting such signaling, and/or a method of operating a network node in a radio network comprising such transmitting. A UE adapted for receiving such signaling, and/or a method of operating a UE comprising such receiving may be considered. Corresponding processing circuitry and/or radio circuitry of a network node and/or UE may be considered.

According to some approaches, a UE may ignore for Msg3 (at least when transform precoding is enabled for Msg3) or other PUSCH transmission any UE-specific parameters (such as sequenceHoppingEnabled) or corresponding UE-specific configuration, but only applies cell-specific parameters and/or follows a default rule for Msg3 or PUSCH transmission.

In general, a UE adapted to implement any one or any combination of approaches and/or alternatives disclosed herein may be considered, as may a corresponding method of operating a UE. A network node adapted for receiving signaling accordingly, and/or a method of operating such a network node are described.

Figure 2:
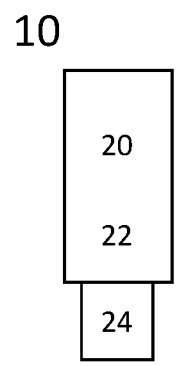
FIG. 2, showing an exemplary radio node implemented as terminal or UE.

FIG. 2 schematically shows a radio node, in particular a terminal or wireless device 10, which may in particular be implemented as a UE (User Equipment). Radio node comprises processing circuitry (which may also be referred to as control circuitry) 20, which may comprise a controller connected to a memory. Any module of the radio node 10, e.g. a communicating module or determining module, may be implemented in and/or executable by, the processing circuitry 20, in particular as module in the controller. Radio node 10 also comprises radio circuitry 22 providing receiving and transmitting or transceiving functionality (e.g., one or more transmitters and/or receivers and/or transceivers), the radio circuitry 22 being connected or connectable to the processing circuitry. An antenna circuitry 24 of the radio node 10 is connected or connectable to the radio circuitry 22 to collect or send and/or amplify signals. Radio circuitry 22 and the processing circuitry 20 controlling it are configured for cellular communication with a network, e.g. a RAN as described herein, and/or for sidelink communication. Radio node 10 may generally be adapted to carry out any of the methods of operating a radio node like terminal or UE disclosed herein; in particular, it may comprise corresponding circuitry, e.g. processing circuitry, and/or modules.

Figure 3:
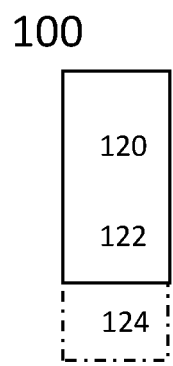
FIG. 3, showing an exemplary radio node implemented as network node.

FIG. 3 schematically show a radio node 100, which may in particular be implemented as a network node 100, for example an eNB or gNB or similar for NR. Radio node 100 comprises processing circuitry (which may also be referred to as control circuitry) 120, which may comprise a controller connected to a memory. Any module, e.g. transmitting module and/or receiving module and/or configuring module of the node 100 may be implemented in and/or executable by the processing circuitry 120. The processing circuitry 120 is connected to control radio circuitry 122 of the node 100, which provides receiver and transmitter and/or transceiver functionality (e.g., comprising one or more transmitters and/or receivers and/or transceivers). An antenna circuitry 124 may be connected or connectable to radio circuitry 122 for signal reception or transmittance and/or amplification. Node 100 may be adapted to carry out any of the methods for operating a radio node or network node disclosed herein; in particular, it may comprise corresponding circuitry, e.g. processing circuitry, and/or modules. The antenna circuitry 124 may be connected to and/or comprise an antenna array. The node 100, respectively its circuitry, may be adapted to perform any of the methods of operating a network node or a radio node as described herein; in particular, it may comprise corresponding circuitry, e.g. processing circuitry, and/or modules. The radio node 100 may generally comprise communication circuitry, e.g. for communication with another network node, like a radio node, and/or with a core network and/or an internet or local net, in particular with an information system, which may provide information and/or data to be transmitted to a user equipment.

References to specific resource structures like transmission timing structure and/or symbol and/or slot and/or mini-slot and/or subcarrier and/or carrier may pertain to a specific numerology, which may be predefined and/or configured or configurable. A transmission timing structure may represent a time interval, which may cover one or more symbols. Some examples of a transmission timing structure are transmission time interval (TTI), subframe, slot and mini-slot. A slot may comprise a predetermined, e.g. predefined and/or configured or configurable, number of symbols, e.g. 6 or 7, or 12 or 14. A mini-slot may comprise a number of symbols (which may in particular be configurable or configured) smaller than the number of symbols of a slot, in particular 1, 2, 3 or 4 symbols. A transmission timing structure may cover a time interval of a specific length, which may be dependent on symbol time length and/or cyclic prefix used. A transmission timing structure may pertain to, and/or cover, a specific time interval in a time stream, e.g. synchronized for communication. Timing structures used and/or scheduled for transmission, e.g. slot and/or mini-slots, may be scheduled in relation to, and/or synchronized to, a timing structure provided and/or defined by other transmission timing structures. Such transmission timing structures may define a timing grid, e.g., with symbol time intervals within individual structures representing the smallest timing units. Such a timing grid may for example be defined by slots or subframes (wherein in some cases, subframes may be considered specific variants of slots). A transmission timing structure may have a duration (length in time) determined based on the durations of its symbols, possibly in addition to cyclic prefix/es used. The symbols of a transmission timing structure may have the same duration, or may in some variants have different duration. The number of symbols in a transmission timing structure may be predefined and/or configured or configurable, and/or be dependent on numerology. The timing of a mini-slot may generally be configured or configurable, in particular by the network and/or a network node. The timing may be configurable to start and/or end at any symbol of the transmission timing structure, in particular one or more slots.

There is generally considered a program product comprising instructions adapted for causing processing and/or control circuitry to carry out and/or control any method described herein, in particular when executed on the processing and/or control circuitry. Also, there is considered a carrier medium arrangement carrying and/or storing a program product as described herein.

A carrier medium arrangement may comprise one or more carrier media. Generally, a carrier medium may be accessible and/or readable and/or receivable by processing or control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc. A carrier medium or storage medium may in particular be a non-transitory medium.

A system comprising one or more radio nodes as described herein, in particular a network node and a user equipment, is described. The system may be a wireless communication system, and/or provide and/or represent a radio access network.

Moreover, there may be generally considered a method of operating an information system, the method comprising providing information. Alternatively, or additionally, an information system adapted for providing information may be considered. Providing information may comprise providing information for, and/or to, a target system, which may comprise and/or be implemented as radio access network and/or a radio node, in particular a network node or user equipment or terminal. Providing information may comprise transferring and/or streaming and/or sending and/or passing on the information, and/or offering the information for such and/or for download, and/or triggering such providing, e.g. by triggering a different system or node to stream and/or transfer and/or send and/or pass on the information. The information system may comprise, and/or be connected or connectable to, a target, for example via one or more intermediate systems, e.g. a core network and/or internet and/or private or local network. Information may be provided utilising and/or via such intermediate system/s. Providing information may be for radio transmission and/or for transmission via an air interface and/or utilising a RAN or radio node as described herein. Connecting the information system to a target, and/or providing information, may be based on a target indication, and/or adaptive to a target indication. A target indication may indicate the target, and/or one or more parameters of transmission pertaining to the target and/or the paths or connections over which the information is provided to the target. Such parameter/s may in particular pertain to the air interface and/or radio access network and/or radio node and/or network node. Example parameters may indicate for example type and/or nature of the target, and/or transmission capacity (e.g., data rate) and/or latency and/or reliability and/or cost, respectively one or more estimates thereof. The target indication may be provided by the target, or determined by the information system, e.g. based on information received from the target and/or historical information, and/or be provided by a user, for example a user operating the target or a device in communication with the target, e.g. via the RAN and/or air interface. For example, a user may indicate on a user equipment communicating with the information system that information is to be provided via a RAN, e.g. by selecting from a selection provided by the information system, for example on a user application or user interface, which may be a web interface. An information system may comprise one or more information nodes. An information node may generally comprise processing circuitry and/or communication circuitry. In particular, an information system and/or an information node may be implemented as a computer and/or a computer arrangement, e.g. a host computer or host computer arrangement and/or server or server arrangement. In some variants, an interaction server (e.g., web server) of the information system may provide a user interface, and based on user input may trigger transmitting and/or streaming information provision to the user (and/or the target) from another server, which may be connected or connectable to the interaction server and/or be part of the information system or be connected or connectable thereto. The information may be any kind of data, in particular data intended for a user of for use at a terminal, e.g. video data and/or audio data and/or location data and/or interactive data and/or game-related data and/or environmental data and/or technical data and/or traffic data and/or vehicular data and/or circumstantial data and/or operational data. The information provided by the information system may be mapped to, and/or mappable to, and/or be intended for mapping to, communication or data signaling and/or one or more data channels as described herein (which may be signaling or channel/s of an air interface and/or used within a RAN and/or for radio transmission). It may be considered that the information is formatted based on the target indication and/or target, e.g. regarding data amount and/or data rate and/or data structure and/or timing, which in particular may be pertaining to a mapping to communication or data signaling and/or a data channels. Mapping information to data signaling and/or data channel/s may be considered to refer to using the signaling/channel/s to carry the data, e.g.

on higher layers of communication, with the signaling/channel/s underlying the transmission. A target indication generally may comprise different components, which may have different sources, and/or which may indicate different characteristics of the target and/or communication path/s thereto. A format of information may be specifically selected, e.g. from a set of different formats, for information to be transmitted on an air interface and/or by a RAN as described herein. This may be particularly pertinent since an air interface may be limited in terms of capacity and/or of predictability, and/or potentially be cost sensitive. The format may be selected to be adapted to the transmission indication, which may in particular indicate that a RAN or radio node as described herein is in the path (which may be the indicated and/or planned and/or expected path) of information between the target and the information system. A (communication) path of information may represent the interface/s (e.g., air and/or cable interfaces) and/or the intermediate system/s (if any), between the information system and/or the node providing or transferring the information, and the target, over which the information is, or is to be, passed on. A path may be (at least partly) undetermined when a target indication is provided, and/or the information is provided/transferred by the information system, e.g. if an internet is involved, which may comprise multiple, dynamically chosen paths. Information and/or a format used for information may be packet-based, and/or be mapped, and/or be mappable and/or be intended for mapping, to packets. Alternatively, or additionally, there may be considered a method for operating a target device comprising providing a target indicating to an information system. More alternatively, or additionally, a target device may be considered, the target device being adapted for providing a target indication to an information system. In another approach, there may be considered a target indication tool adapted for, and/or comprising an indication module for, providing a target indication to an information system. The target device may generally be a target as described above. A target indication tool may comprise, and/or be implemented as, software and/or application or app, and/or web interface or user interface, and/or may comprise one or more modules for implementing actions performed and/or controlled by the tool. The tool and/or target device may be adapted for, and/or the method may comprise, receiving a user input, based on which a target indicating may be determined and/or provided. Alternatively, or additionally, the tool and/or target device may be adapted for, and/or the method may comprise, receiving information and/or communication signaling carrying information, and/or operating on, and/or presenting (e.g., on a screen and/or as audio or as other form of indication), information. The information may be based on received information and/or communication signaling carrying information. Presenting information may comprise processing received information, e.g. decoding and/or transforming, in particular between different formats, and/or for hardware used for presenting. Operating on information may be independent of or without presenting, and/or proceed or succeed presenting, and/or may be without user interaction or even user reception, for example for automatic processes, or target devices without (e.g., regular) user interaction like MTC devices, of for automotive or transport or industrial use. The information or communication signaling may be expected and/or received based on the target indication. Presenting and/or operating on information may generally comprise one or more processing steps, in particular decoding and/or executing and/or interpreting and/or transforming information. Operating on information may generally comprise relaying and/or transmitting the information, e.g. on an air interface, which may include mapping the information onto signaling (such mapping may generally pertain to one or more layers, e.g. one or more layers of an air interface, e.g. RLC (Radio Link Control) layer and/or MAC layer and/or physical layer/s). The information may be imprinted (or mapped) on communication signaling based on the target indication, which may make it particularly suitable for use in a RAN (e.g., for a target device like a network node or in particular a UE or terminal). The tool may generally be adapted for use on a target device, like a UE or terminal. Generally, the tool may provide multiple functionalities, e.g. for providing and/or selecting the target indication, and/or presenting, e.g. video and/or audio, and/or operating on and/or storing received information. Providing a target indication may comprise transmitting or transferring the indication as signaling, and/or carried on signaling, in a RAN, for example if the target device is a UE, or the tool for a UE. It should be noted that such provided information may be transferred to the information system via one or more additionally communication interfaces and/or paths and/or connections. The target indication may be a higher-layer indication and/or the information provided by the information system may be higher-layer information, e.g. application layer or user-layer, in particular above radio layers like transport layer and physical layer. The target indication may be mapped on physical layer radio signaling, e.g. related to or on the user-plane, and/or the information may be mapped on physical layer radio communication signaling, e.g. related to or on the user-plane (in particular, in reverse communication directions). The described approaches allow a target indication to be provided, facilitating information to be provided in a specific format particularly suitable and/or adapted to efficiently use an air interface. A user input may for example represent a selection from a plurality of possible transmission modes or formats, and/or paths, e.g. in terms of data rate and/or packaging and/or size of information to be provided by the information system.

In general, a numerology and/or subcarrier spacing may indicate the bandwidth (in frequency domain) of a subcarrier of a carrier, and/or the number of subcarriers in a carrier and/or the numbering of the subcarriers in a carrier. Different numerologies may in particular be different in the bandwidth of a subcarrier. In some variants, all the subcarriers in a carrier have the same bandwidth associated to them. The numerology and/or subcarrier spacing may be different between carriers in particular regarding the subcarrier bandwidth. A symbol time length, and/or a time length of a timing structure pertaining to a carrier may be dependent on the carrier frequency, and/or the subcarrier spacing and/or the numerology. In particular, different numerologies may have different symbol time lengths.

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

Reference signaling may be signaling comprising one or more reference symbols and/or structures. Reference signaling may be adapted for gauging and/or estimating and/or representing transmission conditions, e.g. channel conditions and/or transmission path conditions and/or channel (or signal or transmission) quality. It may be considered that the transmission characteristics (e.g., signal strength and/or form and/or modulation and/or timing) of reference signaling are available for both transmitter and receiver of the signaling (e.g., due to being predefined and/or configured or configurable and/or being communicated). Different types of reference signaling may be considered, e.g. pertaining to uplink, downlink or sidelink, cell-specific (in particular, cell-wide, e.g., CRS) or device or user specific (addressed to a specific target or user equipment, e.g., CSI-RS), demodulation-related (e.g., DMRS) and/or signal strength related, e.g. power-related or energy-related or amplitude-related (e.g., SRS or pilot signaling) and/or phase-related, etc.

An antenna arrangement may comprise one or more antenna elements (radiating elements), which may be combined in antenna arrays. An antenna array or subarray may comprise one antenna element, or a plurality of antenna elements, which may be arranged e.g. two dimensionally (for example, a panel) or three dimensionally. It may be considered that each antenna array or subarray or element is separately controllable, respectively that different antenna arrays are controllable separately from each other. A single antenna element/radiator may be considered the smallest example of a subarray. Examples of antenna arrays comprise one or more multi-antenna panels or one or more individually controllable antenna elements. An antenna arrangement may comprise a plurality of antenna arrays. It may be considered that an antenna arrangement is associated to a (specific and/or single) radio node, e.g. a configuring or informing or scheduling radio node, e.g. to be controlled or controllable by the radio node. An antenna arrangements associated to a UE or terminal may be smaller (e.g., in size and/or number of antenna elements or arrays) than the antenna arrangement associated to a network node. Antenna elements of an antenna arrangement may be configurable for different arrays, e.g. to change the beam forming characteristics. In particular, antenna arrays may be formed by combining one or more independently or separately controllable antenna elements or subarrays. The beams may be provided by analog beamforming, or in some variants by digital beamforming. The informing radio nodes may be configured with the manner of beam transmission, e.g. by transmitting a corresponding indicator or indication, for example as beam identify indication. However, there may be considered cases in which the informing radio node/s are not configured with such information, and/or operate transparently, not knowing the way of beamforming used. An antenna arrangement may be considered separately controllable in regard to the phase and/or amplitude/power and/or gain of a signal feed to it for transmission, and/or separately controllable antenna arrangements may comprise an independent or separate transmit and/or receive unit and/or ADC (Analog-Digital-Converter, alternatively an ADC chain) to convert digital control information into an analog antenna feed for the whole antenna arrangement (the ADC may be considered part of, and/or connected or connectable to, antenna circuitry). A scenario in which each antenna element is individually controllable may be referred to as digital beamforming, whereas a scenario in which larger arrays/ subarrays are separately controllable may be considered an example of analog beamforming. Hybrid forms may be considered.

Uplink or sidelink signaling may be OFDMA (Orthogonal Frequency Division Multiple Access) or SC-FDMA (Single Carrier Frequency Division Multiple Access) signaling. Downlink signaling may in particular be OFDMA signaling. However, signaling is not limited thereto (Filter-Bank based signaling may be considered one alternative).

A radio node may generally be considered a device or node adapted for wireless and/or radio (and/or microwave) frequency communication, and/or for communication utilising an air interface, e.g. according to a communication standard.

A radio node may be a network node, or a user equipment or terminal. A network node may be any radio node of a wireless communication network, e.g. a base station and/or gNodeB (gNB) and/or eNodeB (eNB) and/or relay node and/or micro/nano/pico/femto node and/or transmission point (TP) and/or access point (AP) and/or other node, in particular for a RAN as described herein.

The terms wireless device, user equipment (UE) and terminal may be considered to be interchangeable in the context of this disclosure. A wireless device, user equipment or terminal may represent an end device for communication utilising the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal may be mobile or stationary.

A radio node may generally comprise processing circuitry and/or radio circuitry. A radio node, in particular a network node, may in some cases comprise cable circuitry and/or communication circuitry, with which it may be connected or connectable to another radio node and/or a core network.

Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/ or magnetic and/or optical memory, and/or flash memory, and/or hard disk memory, and/or EPROM or EEPROM (Erasable Programmable ROM or Electrically Erasable Programmable ROM).

Radio circuitry may comprise one or more transmitters and/or receivers and/or transceivers (a transceiver may operate or be operable as transmitter and receiver, and/or may comprise joint or separated circuitry for receiving and transmitting, e.g. in one package or housing), and/or may comprise one or more amplifiers and/or oscillators and/or filters, and/or may comprise, and/or be connected or connectable to antenna circuitry and/or one or more antennas and/or antenna arrays. An antenna array may comprise one or more antennas, which may be arranged in a dimensional array, e.g. 2D or 3D array, and/or antenna panels. A remote radio head (RRH) may be considered as an example of an antenna array. However, in some variants, a RRH may be also be implemented as a network node, depending on the kind of circuitry and/or functionality implemented therein.

Communication circuitry may comprise radio circuitry and/or cable circuitry. Communication circuitry generally may comprise one or more interfaces, which may be air interface/s and/or cable interface/s and/or optical interface/s, e.g. laser-based. Interface/s may be in particular packet-based. Cable circuitry and/or a cable interfaces may comprise, and/or be connected or connectable to, one or more cables (e.g., optical fiber-based and/or wire-based), which may be directly or indirectly (e.g., via one or more intermediate systems and/or interfaces) be connected or connectable to a target, e.g. controlled by communication circuitry and/or processing circuitry.

Any one or all of the modules disclosed herein may be implemented in software and/or firmware and/or hardware. Different modules may be associated to different components of a radio node, e.g. different circuitries or different parts of a circuitry. It may be considered that a module is distributed over different components and/or circuitries. A program product as described herein may comprise the modules related to a device on which the program product is intended (e.g., a user equipment or network node) to be executed (the execution may be performed on, and/or controlled by the associated circuitry).

A radio access network may be a wireless communication network, and/or a Radio Access Network (RAN) in particular according to a communication standard. A communication standard may in particular a standard according to 3GPP and/or 5G, e.g. according to NR or LTE, in particular LTE Evolution.

A wireless communication network may be and/or comprise a Radio Access Network (RAN), which may be and/or comprise any kind of cellular and/or wireless radio network, which may be connected or connectable to a core network. The approaches described herein are particularly suitable for a 5G network, e.g. LTE Evolution and/or NR (New Radio), respectively successors thereof. A RAN may comprise one or more network nodes, and/or one or more terminals, and/or one or more radio nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary. A RAN or a wireless communication network may comprise at least one network node and a UE, or at least two radio nodes. There may be generally considered a wireless communication network or system, e.g. a RAN or RAN system, comprising at least one radio node, and/or at least one network node and at least one terminal.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Control information or a control information message or corresponding signaling (control signaling) may be transmitted on a control channel, e.g. a physical control channel, which may be a downlink channel or (or a sidelink channel in some cases, e.g. one UE scheduling another UE). For example, control information/allocation information may be signaled by a network node on PDCCH (Physical Downlink Control Channel) and/or a PDSCH (Physical Downlink Shared Channel) and/or a HARQ-specific channel. Acknowledgement signaling, e.g. as a form of control information or signaling like uplink control information/signaling, may be transmitted by a terminal on a PUCCH (Physical Uplink Control Channel) and/or PUSCH (Physical Uplink Shared Channel) and/or a HARQ-specific channel. Multiple channels may apply for multi-component/multi-carrier indication or signaling.

Signaling may generally be considered to represent an electromagnetic wave structure (e.g., over a time interval and frequency interval), which is intended to convey information to at least one specific or generic (e.g., anyone who might pick up the signaling) target. A process of signaling may comprise transmitting the signaling. Transmitting signaling, in particular control signaling or communication signaling, e.g. comprising or representing acknowledgement signaling and/or resource requesting information, may comprise encoding and/or modulating. Encoding and/or modulating may comprise error detection coding and/or forward error correction encoding and/or scrambling. Receiving control signaling may comprise corresponding decoding and/or demodulation. Error detection coding may comprise, and/or be based on, parity or checksum approaches, e.g. CRC (Cyclic Redundancy Check). Forward error correction coding may comprise and/or be based on for example turbo coding and/or Reed-Muller coding, and/or polar coding and/or LDPC coding (Low Density Parity Check). The type of coding used may be based on the channel (e.g., physical channel) the coded signal is associated to. A code rate may represent the ratio of the number of information bits before encoding to the number of encoded bits after encoding, considering that encoding adds coding bits for error detection coding and forward error correction. Coded bits may refer to information bits (also called systematic bits) plus coding bits.

Communication signaling may comprise, and/or represent, and/or be implemented as, data signaling, and/or user plane signaling. Communication signaling may be associated to a data channel, e.g. a physical downlink channel or physical uplink channel or physical sidelink channel, in particular a PDSCH (Physical Downlink Shared Channel) or PSSCH (Physical Sidelink Shared Channel). Generally, a data channel may be a shared channel or a dedicated channel. Data signaling may be signaling associated to and/or on a data channel.

An indication generally may explicitly and/or implicitly indicate the information it represents and/or indicates. Implicit indication may for example be based on position and/or resource used for transmission. Explicit indication may for example be based on a parametrisation with one or more parameters, and/or one or more index or indices, and/or one or more bit patterns representing the information. It may in particular be considered that control signaling as described herein, based on the utilised resource sequence, implicitly indicates the control signaling type.

A resource element may generally describe the smallest individually usable and/or encodable and/or decodable and/or modulatable and/or demodulatable time-frequency resource, and/or may describe a time-frequency resource covering a symbol time length in time and a subcarrier in frequency. A signal may be allocatable and/or allocated to a resource element. A subcarrier may be a subband of a carrier, e.g. as defined by a standard. A carrier may define a frequency and/or frequency band for transmission and/or reception. In some variants, a signal (jointly encoded/modulated) may cover more than one resource elements. A resource element may generally be as defined by a corresponding standard, e.g. NR or LTE. As symbol time length and/or subcarrier spacing (and/or numerology) may be different between different symbols and/or subcarriers, different resource elements may have different extension (length/width) in time and/or frequency domain, in particular resource elements pertaining to different carriers.

A resource generally may represent a time-frequency and/or code resource, on which signaling, e.g. according to a specific format, may be communicated, for example transmitted and/or received, and/or be intended for transmission and/or reception.

A border symbol may generally represent a starting symbol or an ending symbol for transmitting and/or receiving. A starting symbol may in particular be a starting symbol of uplink or sidelink signaling, for example control signaling or data signaling. Such signaling may be on a data channel or control channel, e.g. a physical channel, in particular a physical uplink shared channel (like PUSCH) or a sidelink data or shared channel, or a physical uplink control channel (like PUCCH) or a sidelink control channel. If the starting symbol is associated to control signaling (e.g., on a control channel), the control signaling may be in response to received signaling (in sidelink or downlink), e.g. representing acknowledgement signaling associated thereto, which may be HARQ or ARQ signaling. An ending symbol may represent an ending symbol (in time) of downlink or sidelink transmission or signaling, which may be intended or scheduled for the radio node or user equipment. Such downlink signaling may in particular be data signaling, e.g. on a physical downlink channel like a shared channel, e.g. a PDSCH (Physical Downlink Shared Channel). A starting symbol may be determined based on, and/or in relation to, such an ending symbol.

A border subcarrier may generally represent a starting subcarrier (e.g., subcarrier lowest in frequency domain) or an ending subcarrier (e.g., highest in frequency domain) of a resource structure, e.g. for transmitting and/or receiving.

Configuring a radio node, in particular a terminal or user equipment, may refer to the radio node being adapted or caused or set and/or instructed to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources. A radio node may configure itself, e.g., based on configuration data received from a network or network node. A network node may utilise, and/or be adapted to utilise, its circuitry/ies for configuring. Allocation information may be considered a form of configuration data. Configuration data may comprise and/or be represented by configuration information, and/or one or more corresponding indications and/or message/s Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor.

A resource structure may be considered to be neighbored in frequency domain by another resource structure, if they share a common border frequency, e.g. one as an upper frequency border and the other as a lower frequency border. Such a border may for example be represented by the upper end of a bandwidth assigned to a subcarrier n, which also represents the lower end of a bandwidth assigned to a subcarrier n+1. A resource structure may be considered to be neighbored in time domain by another resource structure, if they share a common border time, e.g. one as an upper (or right in the figures) border and the other as a lower (or left in the figures) border. Such a border may for example be represented by the end of the symbol time interval assigned to a symbol n, which also represents the beginning of a symbol time interval assigned to a symbol n+1.

Generally, a resource structure being neighbored by another resource structure in a domain may also be referred to as abutting and/or bordering the other resource structure in the domain.

A resource structure may general represent a structure in time and/or frequency domain, in particular representing a time interval and a frequency interval. A resource structure may comprise and/or be comprised of resource elements, and/or the time interval of a resource structure may comprise and/or be comprised of symbol time interval/s, and/or the frequency interval of a resource structure may comprise and/or be comprised of subcarrier/s. A resource element may be considered an example for a resource structure, a slot or mini-slot or a Physical Resource Block (PRB) or parts thereof may be considered others. A resource structure may be associated to a specific channel, e.g. a PUSCH or PUCCH, in particular resource structure smaller than a slot or PRB.

Examples of a resource structure in frequency domain comprise a bandwidth or band, or a bandwidth part. A bandwidth part may be a part of a bandwidth available for a radio node for communicating, e.g. due to circuitry and/or configuration and/or regulations and/or a standard. A bandwidth part may be configured or configurable to a radio node. In some variants, a bandwidth part may be the part of a bandwidth used for communicating, e.g. transmitting and/or receiving, by a radio node. The bandwidth part may be smaller than the bandwidth (which may be a device bandwidth defined by the circuitry/configuration of a device, and/or a system bandwidth, e.g. available for a RAN). It may be considered that a bandwidth part comprises one or more resource blocks or resource block groups, in particular one or more PRBs or PRB groups. A bandwidth part may pertain to, and/or comprise, one or more carriers.

A carrier may generally represent a frequency range or band and/or pertain to a central frequency and an associated frequency interval. It may be considered that a carrier comprises a plurality of subcarriers. A carrier may have assigned to it a central frequency or center frequency interval, e.g. represented by one or more subcarriers (to each subcarrier there may be generally assigned a frequency bandwidth or interval). Different carriers may be non-overlapping, and/or may be neighboring in frequency domain.

It should be noted that the term "radio" in this disclosure may be considered to pertain to wireless communication in general, and may also include wireless communication utilising microwave and/or millimeter and/or other frequencies, in particular between 100 MHz or 1 GHz, and 100 GHz or 20 or 10 GHz. Such communication may utilise one or more carriers.

A radio node, in particular a network node or a terminal, may generally be any device adapted for transmitting and/or receiving radio and/or wireless signals and/or data, in particular communication data, in particular on at least one carrier. The at least one carrier may comprise a carrier accessed based on a LBT procedure (which may be called LBT carrier), e.g., an unlicensed carrier. It may be considered that the carrier is part of a carrier aggregate.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively, or additionally, a cell may comprise at least one carrier for UL communication/transmission and DL communication/transmission, e.g., in TDD-based approaches.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have two component channels, one for each direction. Examples of channels comprise a channel for low latency and/or high reliability transmission, in particular a channel for Ultra-Reliable Low Latency Communication (URLLC), which may be for control and/or data.

In general, a symbol may represent and/or be associated to a symbol time length, which may be dependent on the carrier and/or subcarrier spacing and/or numerology of the associated carrier. Accordingly, a symbol may be considered to indicate a time interval having a symbol time length in relation to frequency domain. A symbol time length may be dependent on a carrier frequency and/or bandwidth and/or numerology and/or subcarrier spacing of, or associated to, a symbol. Accordingly, different symbols may have different symbol time lengths. In particular, numerologies with different subcarrier spacings may have different symbol time length. Generally, a symbol time length may be based on, and/or include, a guard time interval or cyclic extension, e.g. prefix or postfix.

Communication or communicating may generally comprise transmitting and/or receiving signaling. Communication on a sidelink (or sidelink signaling) may comprise utilising the sidelink for communication (respectively, for signaling). Sidelink transmission and/or transmitting on a sidelink may be considered to comprise transmission utilising the sidelink, e.g. associated resources and/or transmission formats and/or circuitry and/or the air interface. Sidelink reception and/or receiving on a sidelink may be considered to comprise reception utilising the sidelink, e.g. associated resources and/or transmission formats and/or circuitry and/or the air interface. Sidelink control information (e.g., SCI) may generally be considered to comprise control information transmitted utilising a sidelink.

A transmission may generally pertain to a specific channel and/or specific resources, in particular with a starting symbol and ending symbol in time, covering the interval therebetween. A scheduled transmission may be a transmission scheduled and/or expected and/or for which resources are scheduled or provided or reserved. However, not every scheduled transmission has to be realized. For example, a scheduled downlink transmission may not be received, or a scheduled uplink transmission may not be transmitted due to power limitations, or other influences (e.g., a channel on an unlicensed carrier being occupied). A transmission may be scheduled for a transmission timing substructure (e.g., a mini-slot, and/or covering only a part of a transmission timing structure) within a transmission timing structure like a slot. A border symbol may be indicative of a symbol in the transmission timing structure at which the transmission starts or ends.

Predefined in the context of this disclosure may refer to the related information being defined for example in a standard, and/or being available without specific configuration from a network or network node, e.g. stored in memory, for example independent of being configured. Configured or configurable may be considered to pertain to the corresponding information being set/configured, e.g. by the network or a network node.

A configuration or schedule, like a mini-slot configuration and/or structure configuration, may schedule transmissions, e.g. for the time/transmissions it is valid, and/or transmissions may be scheduled by separate signaling or separate configuration, e.g. separate RRC signaling and/or downlink control information signaling. The transmission/s scheduled may represent signaling to be transmitted by the device for which it is scheduled, or signaling to be received by the device for which it is scheduled, depending on which side of a communication the device is. It should be noted that downlink control information or specifically DCI signaling may be considered physical layer signaling, in contrast to higher layer signaling like MAC (Medium Access Control) signaling or RRC layer signaling. The higher the layer of signaling is, the less frequent/the more time/resource consuming it may be considered, at least partially due to the information contained in such signaling having to be passed on through several layers, each layer requiring processing and handling.

A scheduled transmission, and/or transmission timing structure like a mini-slot or slot, may pertain to a specific channel, in particular a physical uplink shared channel, a physical uplink control channel, or a physical downlink shared channel, e.g. PUSCH, PUCCH or PDSCH, and/or may pertain to a specific cell and/or carrier aggregation. A corresponding configuration, e.g. scheduling configuration or symbol configuration may pertain to such channel, cell and/or carrier aggregation. It may be considered that the scheduled transmission represents transmission on a physical channel, in particular a shared physical channel, for example a physical uplink shared channel or physical downlink shared channel. For such channels, semi-persistent configuring may be particularly suitable.

Generally, a configuration may be a configuration indicating timing, and/or be represented or configured with corresponding configuration data. A configuration may be embedded in, and/or comprised in, a message or configuration or corresponding data, which may indicate and/or schedule resources, in particular semi-persistently and/or semi-statically.

A control region of a transmission timing structure may be an interval in time for intended or scheduled or reserved for control signaling, in particular downlink control signaling, and/or for a specific control channel, e.g. a physical downlink control channel like PDCCH. The interval may comprise, and/or consist of, a number of symbols in time, which may be configured or configurable, e.g. by (UE-specific) dedicated signaling (which may be single-cast, for example addressed to or intended for a specific UE), e.g. on a PDCCH, or RRC signaling, or on a multicast or broadcast channel. In general, the transmission timing structure may comprise a control region covering a configurable number of symbols. It may be considered that in general the border symbol is configured to be after the control region in time.

The duration of a symbol (symbol time length or interval) of the transmission timing structure may generally be dependent on a numerology and/or carrier, wherein the numerology and/or carrier may be configurable. The numerology may be the numerology to be used for the scheduled transmission.

Scheduling a device, or for a device, and/or related transmission or signaling, may be considered comprising, or being a form of, configuring the device with resources, and/or of indicating to the device resources, e.g. to use for communicating. Scheduling may in particular pertain to a transmission timing structure, or a substructure thereof (e.g., a slot or a mini-slot, which may be considered a substructure of a slot). It may be considered that a border symbol may be identified and/or determined in relation to the transmission timing structure even if for a substructure being scheduled, e.g. if an underlying timing grid is defined based on the transmission timing structure. Signaling indicating scheduling may comprise corresponding scheduling information and/or be considered to represent or contain configuration data indicating the scheduled transmission and/or comprising scheduling information. Such configuration data or signaling may be considered a resource configuration or scheduling configuration. It should be noted that such a configuration (in particular as single message) in some cases may not be complete without other configuration data, e.g. configured with other signaling, e.g. higher layer signaling. In particular, the symbol configuration may be provided in addition to scheduling/resource configuration to identify exactly which symbols are assigned to a scheduled transmission. A scheduling (or resource) configuration may indicate transmission timing structure/s and/or resource amount (e.g., in number of symbols or length in time) for a scheduled transmission.

A scheduled transmission may be transmission scheduled, e.g. by the network or network node. Transmission may in this context may be uplink (UL) or downlink (DL) or sidelink (SL) transmission. A device, e.g. a user equipment, for which the scheduled transmission is scheduled, may accordingly be scheduled to receive (e.g., in DL or SL), or to transmit (e.g. in UL or SL) the scheduled transmission. Scheduling transmission may in particular be considered to comprise configuring a scheduled device with resource/s for this transmission, and/or informing the device that the transmission is intended and/or scheduled for some resources. A transmission may be scheduled to cover a time interval, in particular a successive number of symbols, which may form a continuous interval in time between (and including) a starting symbol and an ending symbols. The starting symbol and the ending symbol of a (e.g., scheduled) transmission may be within the same transmission timing structure, e.g. the same slot. However, in some cases, the ending symbol may be in a later transmission timing structure than the starting symbol, in particular a structure following in time. To a scheduled transmission, a duration may be associated and/or indicated, e.g. in a number of symbols or associated time intervals. In some variants, there may be different transmissions scheduled in the same transmission timing structure. A scheduled transmission may be considered to be associated to a specific channel, e.g. a shared channel like PUSCH or PDSCH. A transmission timing structure may comprise a plurality of symbols, and/or define an interval comprising several symbols (respectively their associated time intervals). In the context of this disclosure, it should be noted that a reference to a symbol for ease of reference may be interpreted to refer to the time domain projection or time interval or time component or duration or length in time of the symbol, unless it is clear from the context that the frequency domain component also has to be considered. Examples of transmission timing structures include slot, subframe, mini-slot (which also may be considered a substructure of a slot), slot aggregation (which may comprise a plurality of slots and may be considered a superstructure of a slot), respectively their time domain component. A transmission timing structure may generally comprise a plurality of symbols defining the time domain extension (e.g., interval or length or duration) of the transmission timing structure, and arranged neighboring to each other in a numbered sequence. A timing structure (which may also be considered or implemented as synchronisation structure) may be defined by a succession of such transmission timing structures, which may for example define a timing grid with symbols representing the smallest grid structures. A transmission timing structure, and/or a border symbol or a scheduled transmission may be determined or scheduled in relation to such a timing grid. A transmission timing structure of reception may be the transmission timing structure in which the scheduling control signaling is received, e.g. in relation to the timing grid. A transmission timing structure may in particular be a slot or subframe or in some cases, a mini-slot.

In the context of this disclosure, there may be distinguished between dynamically scheduled or aperiodic transmission and/or configuration, and semi-static or semi-persistent or periodic transmission and/or configuration. The term "dynamic" or similar terms may generally pertain to configuration/transmission valid and/or scheduled and/or configured for (relatively) short timescales and/or a (e.g., predefined and/or configured and/or limited and/or definite) number of occurrences and/or transmission timing structures, e.g. one or more transmission timing structures like slots or slot aggregations, and/or for one or more (e.g., specific number) of transmission/occurrences. Dynamic configuration may be based on low-level signaling, e.g. control signaling on the physical layer and/or MAC layer, in particular in the form of DCI or SCI. Periodic/semi-static may pertain to longer timescales, e.g. several slots and/or more than one frame, and/or a non-defined number of occurrences, e.g., until a dynamic configuration contradicts, or until a new periodic configuration arrives. A periodic or semi-static configuration may be based on, and/or be configured with, higher-layer signaling, in particular RCL layer signaling and/or RRC signaling and/or MAC signaling.

Signaling may generally comprise one or more symbols and/or signals and/or messages. A signal may comprise and/or represent one or more bits, which may be modulated into a common modulated signal. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different acknowledgement signaling processes, e.g. representing and/or pertaining to one or more such processes. An indication may comprise signaling and/or a plurality of signals and/or messages and/or may be comprised therein, which may be transmitted on different carriers and/or be associated to different acknowledgement signaling processes, e.g. representing and/or pertaining to one or more such processes.

Signaling utilising, and/or on and/or associated to, resources or a resource structure may be signaling covering the resources or structure, signaling on the associated frequency/ies and/or in the associated time interval/s. It may be considered that a signaling resource structure comprises and/or encompasses one or more substructures, which may be associated to one or more different channels and/or types of signaling and/or comprise one or more holes (resource element/s not scheduled for transmissions or reception of transmissions). A resource substructure, e.g. a feedback resource structure, may generally be continuous in time and/or frequency, within the associated intervals. It may be considered that a substructure, in particular a feedback resource structure, represents a rectangle filled with one or more resource elements in time/frequency space. However, in some cases, a resource structure or substructure, in particular a frequency resource range, may represent a non-continuous pattern of resources in one or more domains, e.g. time and/or frequency. The resource elements of a substructure may be scheduled for associated signaling.

A scheduling assignment may be configured with control signaling, e.g. downlink control signaling or sidelink control signaling. Such controls signaling may be considered to represent and/or comprise scheduling signaling, which may indicate scheduling information. A scheduling assignment may be considered scheduling information indicating scheduling of signaling/transmission of signaling, in particular pertaining to signaling received or to be received by the device configured with the scheduling assignment. It may be considered that a scheduling assignment may indicate data (e.g., data block or element and/or channel and/or data stream) and/or an (associated) acknowledgement signaling process and/or resource/s on which the data (or, in some cases, reference signaling) is to be received and/or indicate resource/s for associated feedback signaling, and/or a feedback resource range on which associated feedback signaling is to be transmitted. Transmission associated to an acknowledgement signaling process, and/or the associated resources or resource structure, may be configured and/or scheduled, for example by a scheduling assignment. Different scheduling assignments may be associated to different acknowledgement signaling processes. A scheduling assignment may be considered an example of downlink control information or signaling, e.g. if transmitted by a network node and/or provided on downlink (or sidelink control information if transmitted using a sidelink and/or by a user equipment).

A scheduling grant (e.g., uplink grant) may represent control signaling (e.g., downlink control information/signaling). It may be considered that a scheduling grant configures the signaling resource range and/or resources for uplink (or sidelink) signaling, in particular uplink control signaling and/or feedback signaling, e.g. acknowledgement signaling. Configuring the signaling resource range and/or resources may comprise configuring or scheduling it for transmission by the configured radio node. A scheduling grant may indicate a channel and/or possible channels to be used/usable for the feedback signaling, in particular whether a shared channel like a PUSCH may be used/is to be used. A scheduling grant may generally indicate uplink resource/s and/or an uplink channel and/or a format for control information pertaining to associated scheduling assignments. Both grant and assignment/s may be considered (downlink or sidelink) control information, and/or be associated to, and/or transmitted with, different messages.

A resource structure like a pattern or pattern element in frequency domain (which may be referred to as frequency interval and/or range) may be represented by a subcarrier grouping. A subcarrier grouping may comprise one or more subcarriers, each of which may represent a specific frequency interval, and/or bandwidth. The bandwidth of a subcarrier, the length of the interval in frequency domain, may be determined by the subcarrier spacing and/or numerology. The subcarriers may be arranged such that each subcarrier neighbors at least one other subcarrier of the grouping in frequency space (for grouping sizes larger than 1). The subcarriers of a grouping may be associated to the same carrier, e.g. configurably or configured of predefined. A physical resource block may be considered representative of a grouping (in frequency domain). A subcarrier grouping may be considered to be associated to a specific channel and/or type of signaling, it transmission for such channel or signaling is scheduled and/or transmitted and/or intended and/or configured for at least one, or a plurality, or all subcarriers in the grouping. Such association may be time-dependent, e.g. configured or configurable or predefined, and/or dynamic or semi-static. The association may be different for different devices, e.g. configured or configurable or predefined, and/or dynamic or semi-static. Patterns of subcarrier groupings may be considered, which may comprise one or more subcarrier groupings (which may be associated to same or different signalings/channels), and/or one or more groupings without associated signaling (e.g., as seen from a specific device). An example of a pattern is a comb, for which between pairs of groupings associated to the same signaling/channel there are arranged one or more groupings associated to one or more different channels and/or signaling types, and/or one or more groupings without associated channel/signaling).

Example types of signaling comprise signaling of a specific communication direction, in particular, uplink signaling, downlink signaling, sidelink signaling, as well as reference signaling (e.g., SRS or CRS or CSI-RS), communication signaling, control signaling, and/or signaling associated to a specific channel like PUSCH, PDSCH, PUCCH, PDCCH, PSCCH, PSSCH, etc.).

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or New Radio mobile or wireless communications technologies; however, this does not rule out the use of the present concepts and aspects in connection with additional or alternative mobile communication technologies such as the Global System for Mobile Communications (GSM). While described variants may pertain to certain Technical Specifications (TSs) of the Third Generation Partnership Project (3GPP), it will be appreciated that the present approaches, concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

Some useful abbreviations comprise

| Abbreviation | Explanation |
| --- | --- |
| ACK/NACK | Acknowledgment/Negative Acknowledgement |
| ARQ | Automatic Repeat reQuest |
| CAZAC | Constant Amplitude Zero Cross Correlation |
| CBG | Code Block Group |
| CDM | Code Division Multiplex |
| CM | Cubic Metric |
| CQI | Channel Quality Information |
| CRC | Cyclic Redundancy Check |
| CRS | Common reference signal |

| Abbreviation | Explanation |
|---|---|
| CSI | Channel State Information |
| CSI-RS | Channel state information reference signal |
| DAI | Downlink Assignment Indicator |
| DCI | Downlink Control Information |
| DFT | Discrete Fourier Transform |
| DM(-)RS | Demodulation reference signal(ing) |
| FDM | Frequency Division Multiplex |
| HARQ | Hybrid Automatic Repeat Request |
| IFFT | Inverse Fast Fourier Transform |
| LN | Layer N (according to radio layer structure or OSI) |
| MBB | Mobile Broadband |
| MCS | Modulation and Coding Scheme |
| MIMO | Multiple-input-multiple-output |
| MRC | Maximum-ratio combining |
| MRT | Maximum-ratio transmission |
| MU-MIMO | Multiuser multiple-input-multiple-output |
| OFDM/A | Orthogonal Frequency Division Multiplex/Multiple Access |
| PAPR | Peak to Average Power Ratio |
| PDCCH | Physical Downlink Control Channel |
| PDSCH | Physical Downlink Shared Channel |
| PRACH | Physical Random Access Channel |
| PRB | Physical Resource Block |
| PUCCH | Physical Uplink Control Channel |
| PUSCH | Physical Uplink Shared Channel |
| (P)SCCH | (Physical) Sidelink Control Channel |
| (P)SSCH | (Physical) Sidelink Shared Channel |
| RB | Resource Block |
| RRC | Radio Resource Control |
| SC-FDM/A | Single Carrier Frequency Division Multiplex/Multiple Access |
| SCI | Sidelink Control Information |
| SINR | Signal-to-interference-plus-noise ratio |
| SIR | Signal-to-interference ratio |
| SNR | Signal-to-noise-ratio |
| SR | Scheduling Request |
| SRS | Sounding Reference Signal(ing) |
| SVD | Singular-value decomposition |
| TDM | Time Division Multiplex |
| UCI | Uplink Control Information |
| UE | User Equipment |
| URLLC | Ultra Low Latency High Reliability Communication |
| VL-MIMO | Very-large multiple-input-multiple-output |
| ZF | Zero Forcing |

Abbreviations may be considered to follow 3GPP usage if applicable.

The invention claimed is:

1. A method of operating a user equipment in a radio access network, the user equipment (UE) being configured with a UE-specific configuration for transmitting signaling on a physical channel, the UE further having a cell-specific configuration for transmitting signaling on the physical channel, the method comprising:

transmitting signaling, representing a Msg3 message of a random access procedure, on the physical channel based on the cell-specific configuration ignoring the UE-specific configuration, the ignoring of the UE-specific configuration being based on a parameter indicating a transform precoder to be used for transmitting the signaling.

2. A user equipment (UE) for a radio access network, the UE being one of configured and configurable with a UE-specific configuration for transmitting signaling on a physical channel, the UE being configured with a cell-specific configuration for transmitting signaling on the physical channel, the UE comprising processing circuitry configured to:

transmit signaling, representing a Msg3 message of a random access procedure, on the physical channel based on the cell-specific configuration ignoring the UE-specific configuration, the ignoring of the UE-specific configuration being based on a parameter indicating a transform precoder to be used for transmitting the signaling.

3. The method according to claim 1, wherein the physical channel is a shared channel.

4. The method according to claim 1, wherein the UE-specific configuration is ignored based on an indication indicating a multiple-access approach for the transmitting.

5. The method according to claim 1, wherein the UE-specific configuration is configured with dedicated signaling to the UE.

6. A non-transitory computer storage medium storing an executable computer program comprising instructions configured to cause processing circuitry to at least one of control and perform a method of operating a user equipment in a radio access network, the user equipment (UE) being configured with a UE-specific configuration for transmitting signaling on a physical channel, the UE further having a cell-specific configuration for transmitting signaling on the physical channel, the method comprising:

transmitting signaling, representing a Msg3 message of a random access procedure, on the physical channel based on the cell-specific configuration ignoring the UE-specific configuration, the ignoring of the UE-specific configuration being based on a parameter indicating a transform precoder to be used for transmitting the signaling.

7. The UE according to claim 2, wherein the physical channel is a shared channel.

8. The UE according to claim 2, wherein the UE-specific configuration is ignored based on an indication indicating a multiple-access approach for the transmitting.

9. The UE according to claim 2, wherein the UE-specific configuration is configured with dedicated signaling to the UE.

10. The method according to claim 3, wherein the UE-specific configuration is ignored based on an indication indicating a multiple-access approach for the transmitting.

11. The method according to claim 5, wherein the UE-specific configuration is ignored based on an indication indicating a multiple-access approach for the transmitting.

* * * * *